United States Patent [19]

Southward et al.

[11] 4,170,368

[45] Oct. 9, 1979

[54] TRANSPORTATION OF DISABLED OR INVALIDED PERSONS

[75] Inventors: Leonard B. Southward; Christopher J. Simpson, both of Paraparaumu; Charles R. Tunbridge, Raumati Beach, all of New Zealand

[73] Assignee: Southward Engineering Co. Limited, Lower Hutt, New Zealand

[21] Appl. No.: 853,239

[22] Filed: Nov. 21, 1977

[30] Foreign Application Priority Data

Nov. 22, 1976 [NZ] New Zealand ........................ 182687

[51] Int. Cl.[2] ................................................ B60P 1/46

[52] U.S. Cl. .................... 280/242 WC; 280/289 WC; 297/DIG. 4; 414/921

[58] Field of Search ........... 280/211, 242 R, 242 WC, 280/289 WC; 214/DIG. 13, 75; 297/DIG. 4; 248/124, 125

[56] References Cited

U.S. PATENT DOCUMENTS

| | | | |
|---|---|---|---|
| 1,600,131 | 9/1926 | Overton | 280/242 WC |
| 3,515,294 | 6/1970 | Southward et al. | 214/DIG. 13 |
| 3,627,241 | 12/1971 | Santirocco | 248/125 X |
| 3,807,520 | 4/1974 | Chisholm | 297/DIG. 4 X |
| 3,865,427 | 2/1975 | Delahy | 297/DIG. 4 X |
| 3,893,708 | 7/1975 | Moroney | 297/DIG. 4 X |
| 4,007,959 | 2/1977 | Juergens | 297/DIG. 4 X |

*Primary Examiner*—Joseph F. Peters, Jr.
*Assistant Examiner*—Michael Mar
*Attorney, Agent, or Firm*—Anthony J. Casella

[57] ABSTRACT

The invention relates to a means of transportation for disabled or invalided persons and includes a seating unit which is engageable with wheeled base parts for use as a wheelchair or engageable with a base support in a motor car for use as a car passenger seating unit, the wheeled base parts being separable and/or collapsible for stowage and transportation and the vehicle being provided with a rigid support unit having part movable and detachably engageable with the seating unit for carrying the seating unit and a person thereon into and out of the motor car when the seating unit is disengaged from the wheeled base parts.

19 Claims, 13 Drawing Figures

TRANSPORTATION OF DISABLED OR INVALIDED PERSONS

This invention relates to the transportation of disabled or invalided persons and more particularly relates to wheelchair constructions and the moving of invalided persons for such as transportation as in motor vehicles.

An object of this invention is to provide an improved construction of wheelchair with detachable and/or collapsible parts facilitating stowage when not in use, and lifting and support apparatus whereby a disabled or invalided person can be lifted on a seating unit of the wheel chair and moved to another position such as into a motor car and without the need for the person being removed from the seating unit of the wheelchair, the lifting and support apparatus facilitating raising and lowering of the seat unit and pivoting movement of a support frame of the apparatus arranged for detachable engagement with said seating unit.

Other and more particular objects and advantages of the present invention in its various forms will become apparent from the ensuing description.

According to a first aspect of this invention therefore, there is provided transportation means for disabled or invalided persons comprising a collapsible wheelchair having a seating unit with a seat part and associated backrest, wheeled base parts with which the seating unit can be detachably engaged for propulsion as required, said wheeled base parts being collapsible in unitary or separable form for stowage, locking means to secure the seating unit to the wheeled base parts when engaged therewith, and said seating unit being arranged for connection to and support by a support unit fixedly mounted remote and separate from the wheeled base; said support unit mounting a movable frame having an outer end part arranged for detachable engagement with the seating unit and being arranged to support and carry the seating unit with a person thereon from a first prescribed position to a second prescribed position following disengagement of the seating unit from the wheeled base parts, and being movable from the second prescribed position to the first prescribed position for re-engagement of the seating unit with the wheeled base parts and detachment of the movable frame.

According to a second aspect of this invention, there is provided transportation means for disabled or invalided persons comprising a collapsible wheelchair having a seating unit with a seat part and associated backrest, wheeled base parts with which the seating unit can be detachably engaged for propulsion as required, locking means to secure the seating unit to the wheeled base parts when engaged therewith, a support unit remote and separate from the wheeled base, said support unit mounting a movable frame having an outer end part arranged for detachable engagement with the seating unit, the support unit including an axially rotatable upright screw threaded shaft with which a mounting of the movable frame is engaged so that rotational movement of the support shaft can effect raising or lowering of said movable frame whereby the seating unit can be raised and disengaged from the wheeled base parts and moved to a prescribed position when said frame is engaged with said seating unit, or can be moved from said prescribed position and re-engaged with the wheeled base parts for transportation elsewhere on detachment of the movable frame from the seating unit.

In preferred aspects of the invention the seat unit is intended to double as a seat unit of a passenger motor car and the support unit is accordingly provided as a permanent fixture in such motor car, and preferred aspects of this application of the invention will now be described by way of example and with reference to the accompanying drawings, in which.

Figure 1:
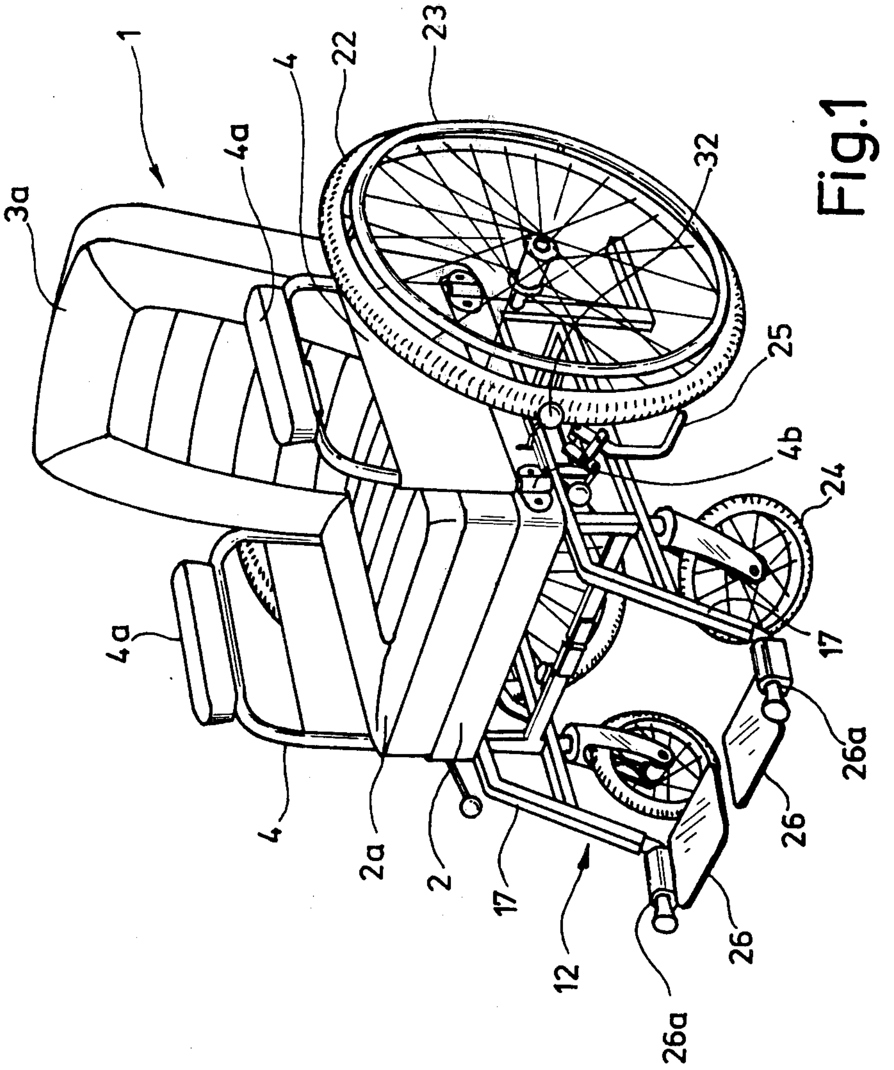
FIG. 1 is a front perspective view of a first form of the seating unit and wheeled base unit forming a hand propelled wheelchair.

Referring firstly to FIGS. 1 to 7 of the drawings, the seating unit (generally indicated by the arrow 1) is preferably shaped to conform with, and may be also tailored to conform with, the remaining or main seating of the motor car for which the invention is intended and includes a strong metal connected seat base 2 and backrest 3 with suitably padded and upholstered seat and backrest parts, 2*a* and 3*a* respectively. Preferably also the seating unit 1 includes side members 4 with cushioned armrests 4*a* and each or at least one (on the passenger door side of the vehicle for which the seating unit is intended) side member 4 is detachably engaged with the seat base 2 such as by a spigot and socket arrangement 4*b*, the side members 4 and armrests 4*a* providing added support for a person on the seating unit 1 and the removal of at least one of said side members 4 facilitating the placement on or removal from the seating unit 1 of a person.

The seating unit 1 is arranged to detachably locate on a suitable base support 5 secured to the vehicle floor and the support unit, generally indicated by the arrow 6, is fixedly mounted in the car behind said support base 5 and may include an upright support tube member 7 having a lower end part fixedly mounted at or near the car floor and an upper part fixedly mounted such as to a door pillar or a roof part of the car.

The support unit 6 includes further a tubular sleeve member 8 which is mounted for sliding and pivoting movement on said tubular support 7; and a pivoted frame 9, which may include two or more interconnected pivot arm members 9*a*, extends laterally from the sleeve 8 to have upper and lower free end portions which are arranged for detachable engagement with the seating unit backrest part 3 e.g. the pivoted frame 9 may have an upper projection 9*b* over which an apertured or recessed lug or bracket arrangement 10 secured to the backrest part 3 can locate, and a lower projection 9*c* which may locate in an open groove or channelled part of a lower lug or like projection 11 provided at the lower side of the backrest part 3. The lower lug or projection 11 which may tend normally to project further out from the backrest part 3 than the upper bracket 10 as the backrest is normally inclined, can be arranged to be pivoted out of the way or slid out of the way into a suitably provided socket 11*a* at the base of the backrest part 3 so that it will not be in the way of the legs of a person pushing the seating unit 1 when engaged with its wheeled base parts, generally indicated by the arrow 12, and detached from the motor car.

The sleeve 8 and attached pivoted frame 9 are arranged to be raised and lowerd relative to the stationary upright support tube 7 to effect raising and lowering of the seating unit 1, and in one form of the invention a screw threaded shaft 13 is located within the support tube member 7 to extend for substantially the full length thereof, and such shaft 13 is arranged to be axially rotatable and preferably such as by way of an electric motor 14 and suitable gear reduction means (not seen) located either at the base of the support unit 6 or at the upper end thereof. The support tube 7 is provided with a longitudinal slot 16 on at least one side, but preferably on opposite sides, and the sleeve 8 is provided, for example at its lower end, with means projecting through said slot(s) 16 to engage the screw threads of the shaft 13 whereby axial rotation of the shaft 13 will effect raising and lowering of the sleeve 8 and attached pivoted frame 9. Preferably the engaging means is in the form of a collar 8*a* housing or forming a frictionless bearing nut comprising a plurality of ball bearings located in recesses or pockets spaced complementary to the screw thread pitch and engaged with such screw threads of the shaft 13 whereby operation of the support unit 6 may be noiseless, smooth and efficient.

Figure 5:
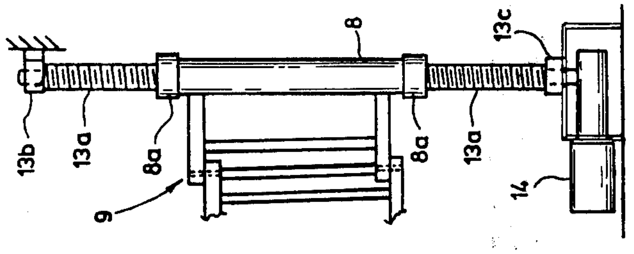
FIG. 5 is a fragmentary view illustrating an alternative support arrangement.
Figure 2:
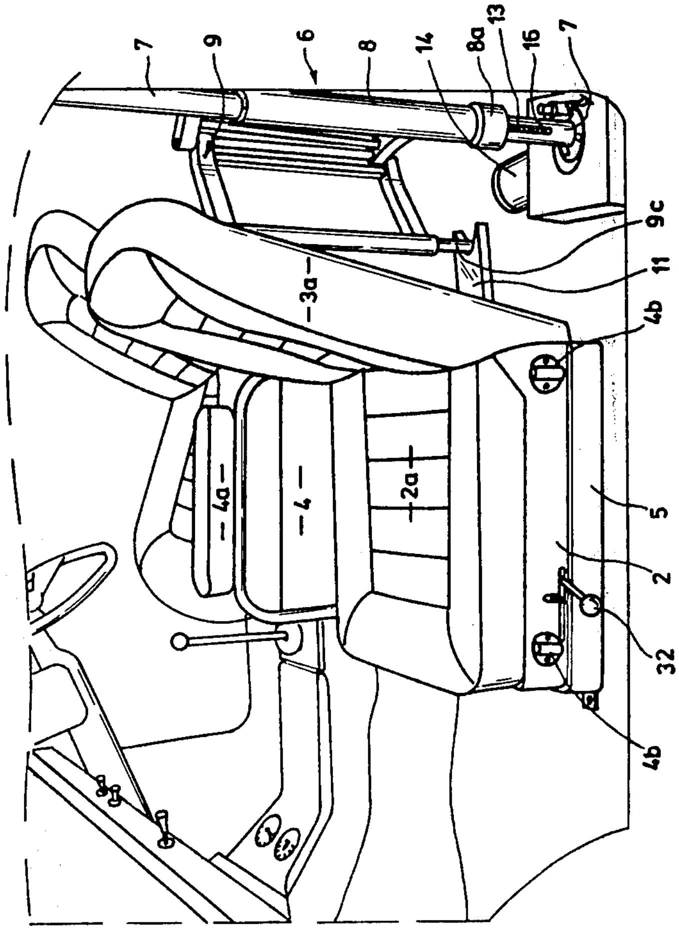
FIG. 2 is a side perspective view illustrating the seat unit of FIG. 1 located in a motor vehicle as a front passenger seat.
Figure 3:
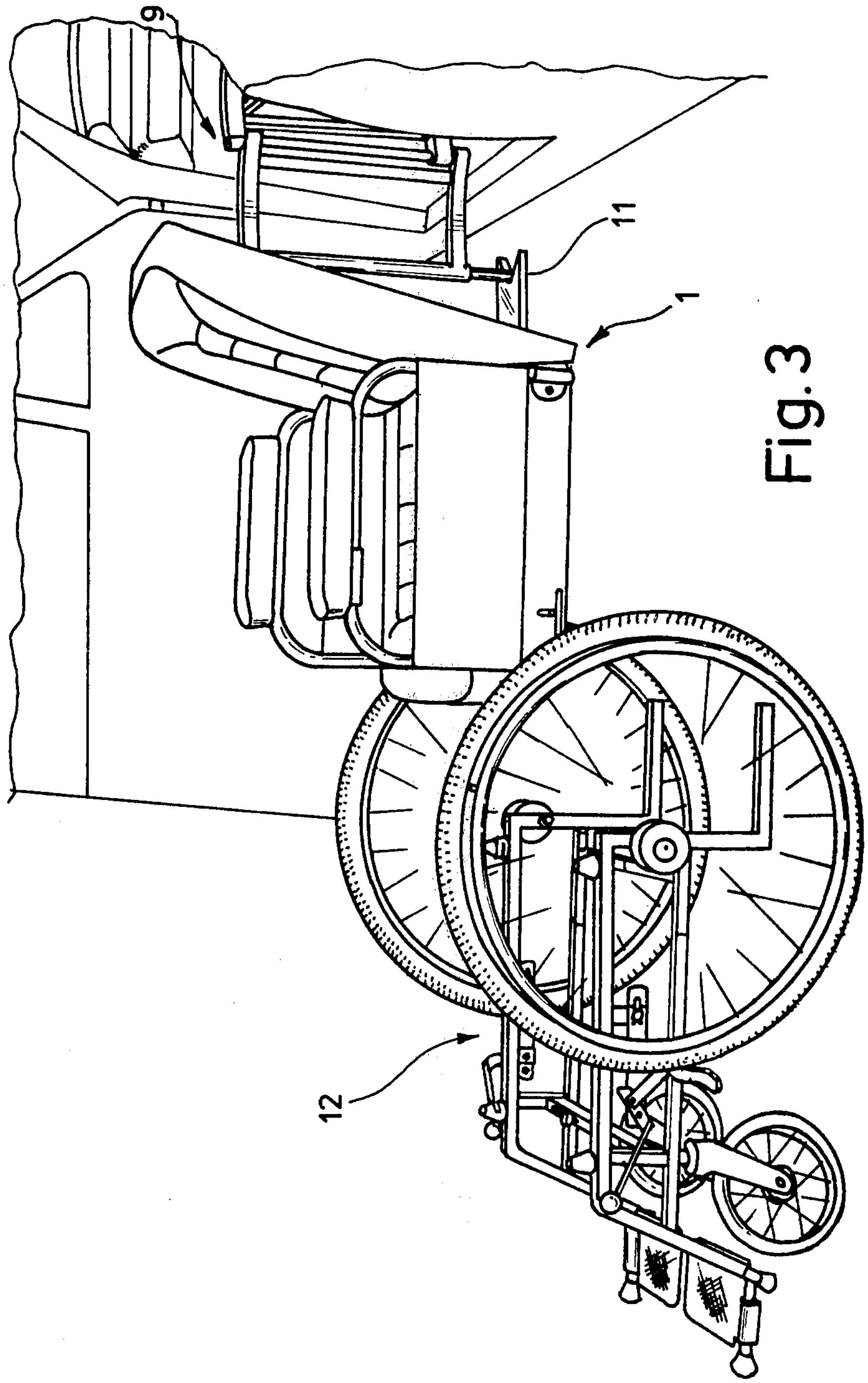
FIG. 3 is a view of the first form of the invention illustrating the transference of the seat unit from the motor vehicle to the wheeled base unit, or vice versa.
Figure 4:
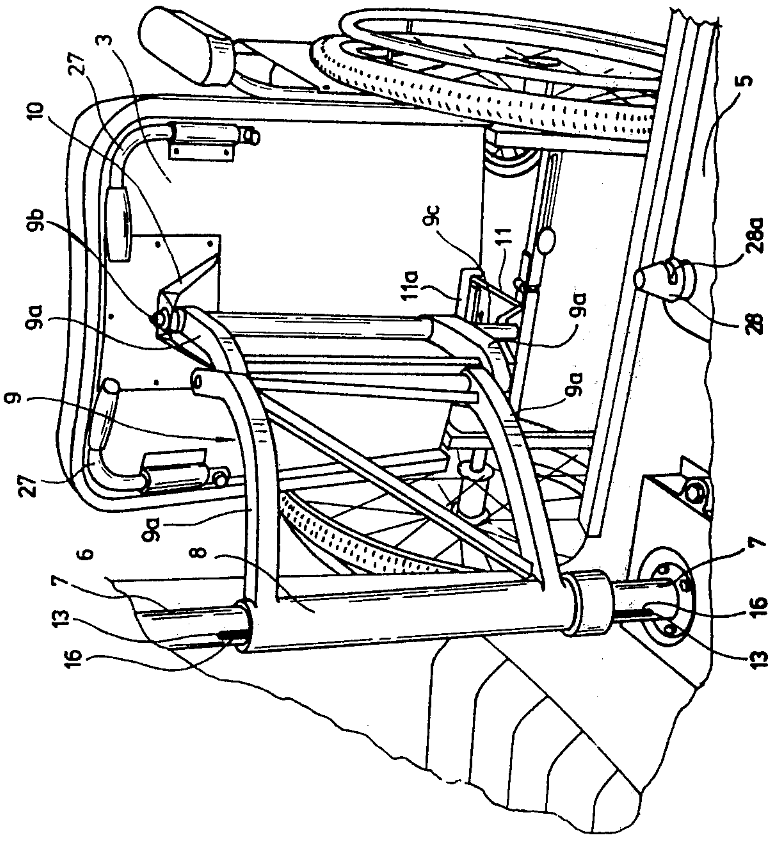
FIG. 4 is a view of the first form of the invention from inside the vehicle showing the rear side of the seat unit and the seat unit located on the wheeled base unit whilst engaged with the pivoted frame.

In an alternative construction, and referring in this instance to FIG. 5 of the drawings, the aforementioned tubular support 7 can be dispensed with and a main screw threaded upright support shaft 13*a* provided with the sleeve 8 located directly about such shaft 13*a* with preferably a bearing nut or thread engaging collar 8*a* at the upper and lower ends of the sleeve 8 for effecting the raising and lowering of the sleeve 8 and attached pivoted frame 9 (and thus the seat unit 1) and the lateral pivoting. Preferably again the nut or thread engaging collars 8*a* are of the aforementioned frictionless ball bearing kind. In this construction the shaft 13*a* is again arranged to be axially rotated by the electric motor 14 and suitable gear reduction means, and is supported directly by upper and lower bearings 13*b* and 13*c*, appropriately positioned and mounted.

It is envisaged that where an electric motor is utilised to effect rotation of either screw threaded shaft, 13 or 13*a*, appropriately positioned limit switches can be provided to effect cutting out of the electrical supply to the motor on the seating unit reaching its fully "home" position on the base support 5, and/or its fully elevated position, and/or a predetermined lowered position externally of the car (e.g. determined by the wheeled base 12 height), and/or overload switch means can be provided to operate on accidental jamming of the apparatus or on the pivoted frame and the seating unit reaching and stopping at their prescribed upper and lower limits of travel.

Figure 6:
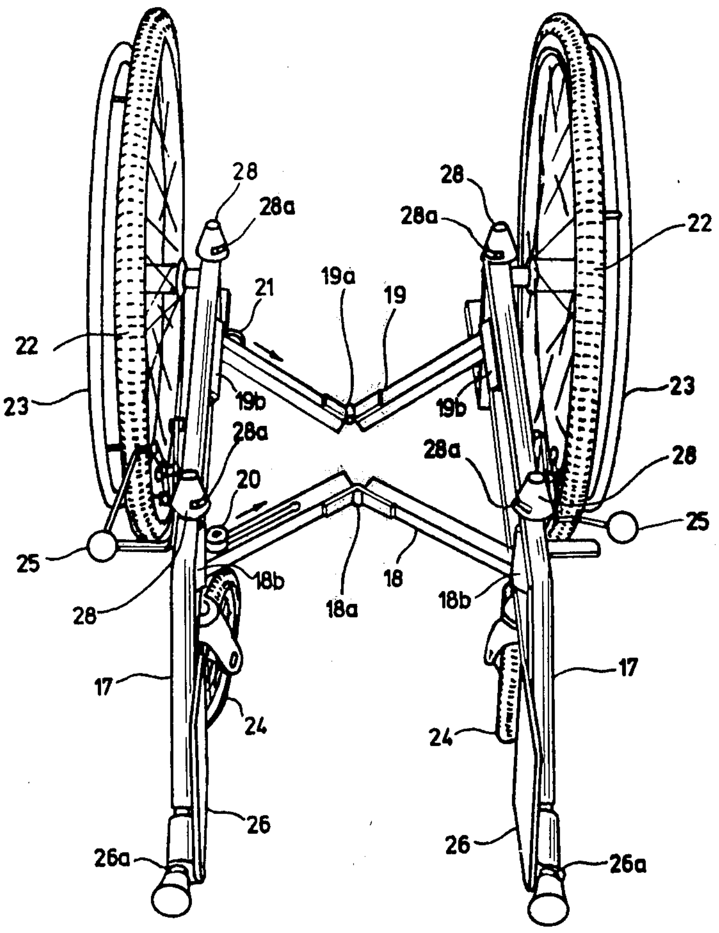
FIG. 6 is a front perspective view of the first form of wheeled base unit showing more particularly a construction permitting collapsing of the wheeled base unit for transportation, the drawing showing the wheeled base unit partially collapsed.
Figure 7:
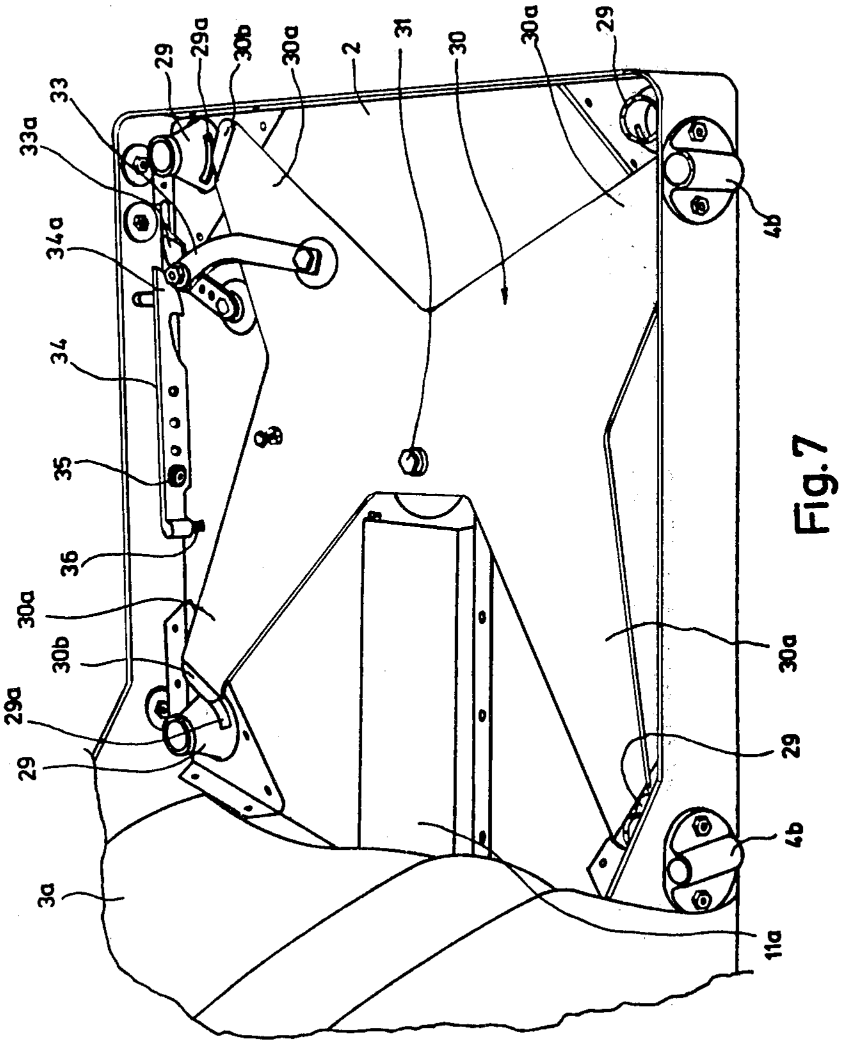
FIG. 7 is a fragmentary view illustrating one form of locking means within the seat part of the seating unit.
Figure 8:
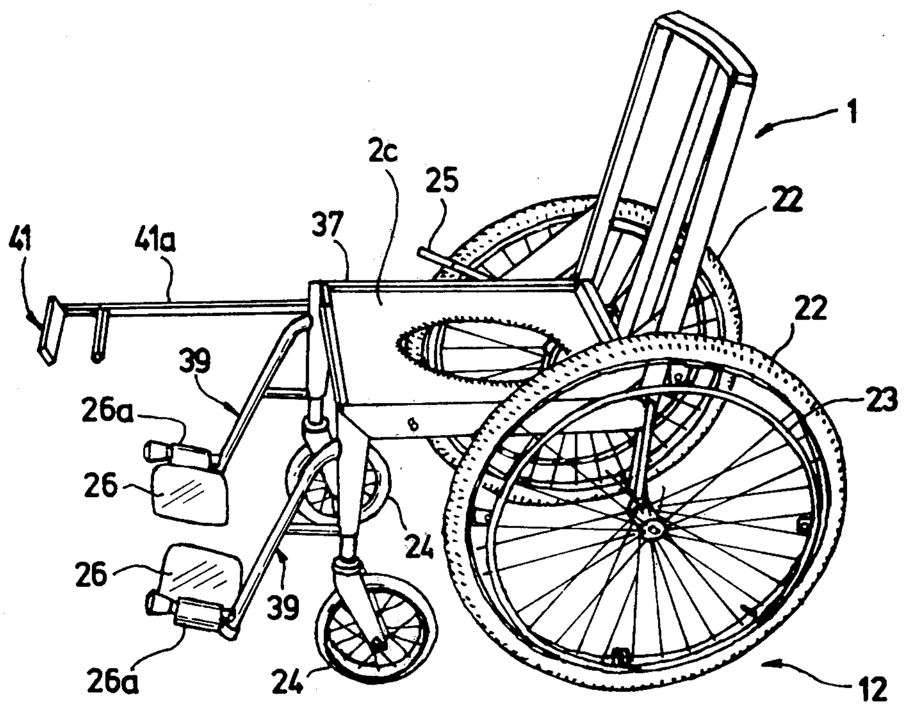
FIG. 8 is a side perspective view of a second form of wheelchair in accordance with the invention, including further modifications and shown with upholstery or cushions on the seating unit.
Figure 9:
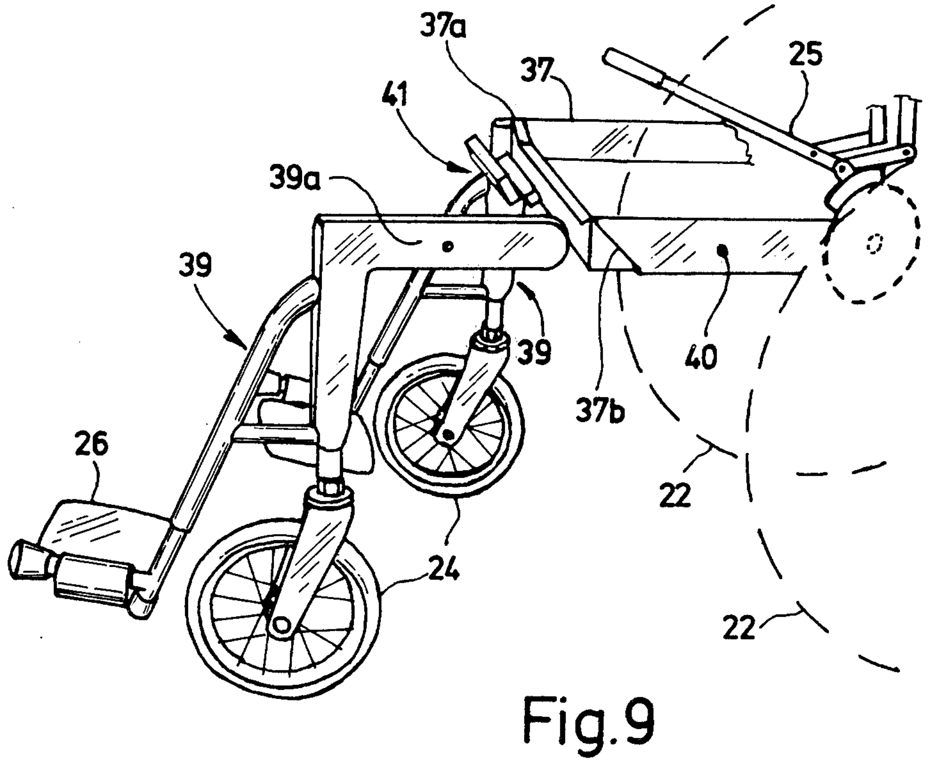
FIG. 9 is a fragmentary side view showing one means for collapsing part of the wheelchair of FIG. 8.
Figure 10:
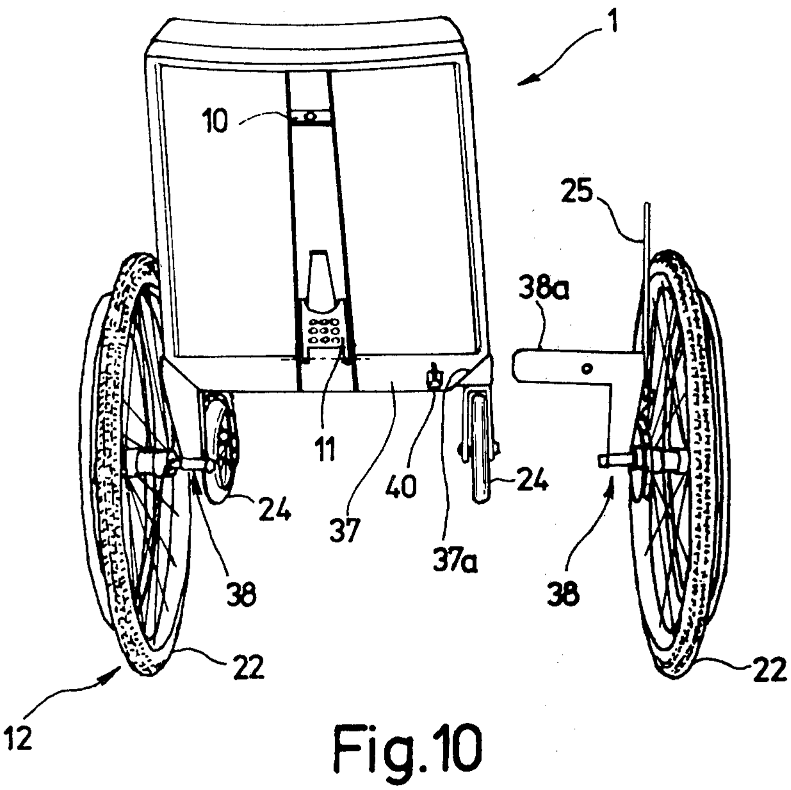
FIG. 10 is a fragmentary rear view showing one means for collapsing a second part of the wheelchair.
Figure 11:
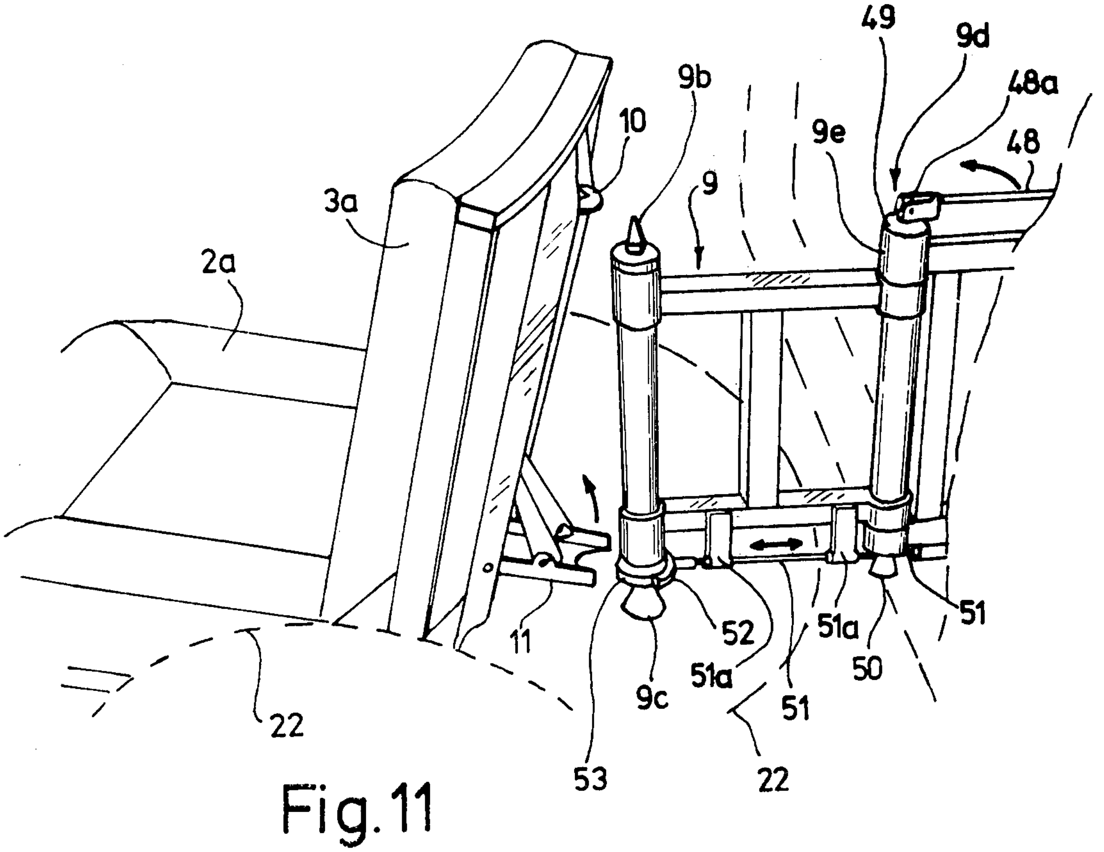
FIG. 11 is a fragmentary view illustrating the second form of wheelchair seating unit about to be engaged with, or just disengaged from the support pivoted frame, the pivoted frame illustrated also including modifications.
Figure 12:
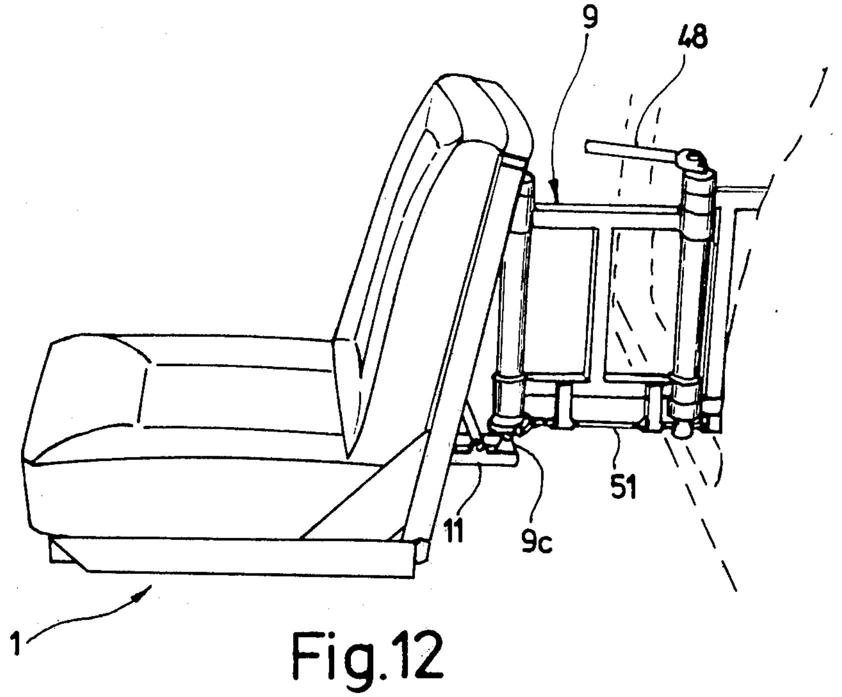
FIG. 12 is a fragmentary view similar to FIG. 11 but showing the wheelchair seating unit engaged with and supported by the support pivoted frame.
Figure 13:
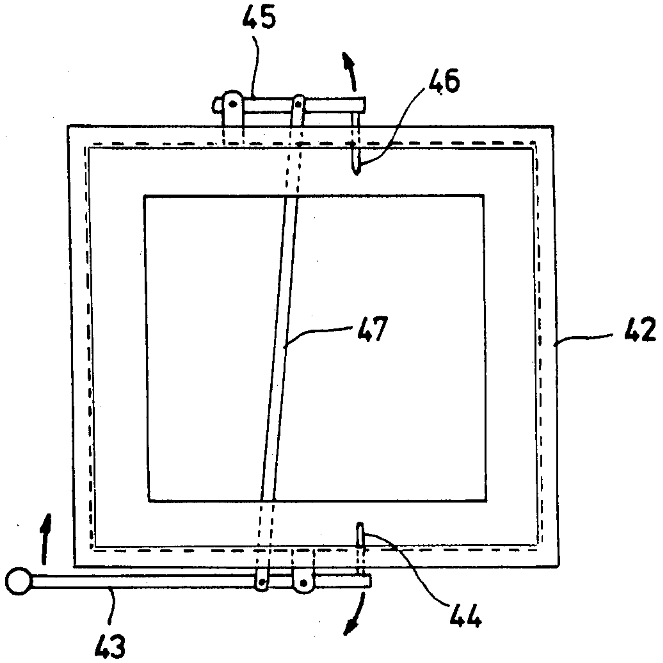
FIG. 13 is a fragmentary view illustrating an example of base mounting in a motor car and with which the seating unit of the second form of wheelchair can be detachably engaged.

In the first form of the invention the wheeled base parts 12 are provided as a unit of strong tubular metal construction and which is collapsible from an erected position so as to be reaily transportable in the vehicle when not being utilised as part of the wheelchair, and accordingly may comprise side frame members 17 conjoined by upper front and rear transverse frame members 18 and 19 which each have a medial pivot connection 18*a* and 19*a* and have their end portions 18*b* and 19*b* pivotally engaged with the side members 17, as shown more particularly in FIG. 6 of the drawings. The end pivotal connections 18*b* and 19*b* are arranged so that one pair pivot about vertical axes and the other pair pivot about horizontal longitudinal axes relative to the side frame members 17, the medial pivot connections having axes parallel with the respective end pivotal connections, and sliding bolt means 20 and 21 can be provided in one half of each cross member 18 and 19 so as to be slidable longitudinally thereof and have the bolts located in the other halves when the two halves of each member 18 and 19 are aligned, to thus lock the unit of wheeled base parts 12 in the erected non-collapsible position.

The unit of wheeled base parts 12 may be similar in some respects to conventional wheelchair constructions in having a pair of large ground wheels 22 with attached concentric annular hand grips 23 for manual propulsion by the person in the chair, and a pair of castor ground wheels 24 permitting steering of the wheelchair formed by the wheeled base 12 and attached seating unit 1. Braking devices 25 are preferably also provided for both the larger ground wheels 22 (hub or disc brake arrangements can be utilised instead of the illustrated tyre periphery braking devices). In the preferred collapsable construction of the present invention, pivoted footrest members 26 may be provided at the forward end of the wheeled base parts unit for pivotal movement upwardly about substantially horizontal forwardly extending pivot connections 26*a* (the footrest members being shown down in the usable position in FIG. 1 and pivoted upwardly for the collapsible position in FIG. 5).

The seating unit backrest part 3 may be provided with hand grips 27 for propulsion of the formed wheelchair by a person other than the disabled or invalided person in the seating unit 1 and preferably such backrest hand grips 27 are pivotally mounted so as to be movable out of the way when the seating unit 1 is located in the motor vehicle.

For detachable engagement of the seating unit 1 on the vehicle support base 5 and the wheeled base 12 in accordance with this first form of the invention, the wheeled base side members 17 can be provided with upstanding projections in the form of conical projections 28, preferably one for each corner of the seating unit base part 2, and the vehicle base support 5 is provided with similar and similarly positioned upwardly extending projections 28, and the seating unit base part 2 is provided on its underside with complementary conical recesses or socket portions 29 which are locatable over the respective projections 28 of the wheeled base side members 17 or the vehicle base support 5.

Locking means are provided to secure the seating unit 1 to either the wheeled base unit or the base support 5 of the vehicle and, with reference in particular to FIG. 6 of the drawings, in one prefered construction the seating unit base part 2 is provided with a locking member 30 mounted below the seat cushion on the metal base part 2 for pivotal movement about a medial connection 31 with the seating unit base part 2, and such member 30 has four arms 30*a* extending towards each socket portion 29 and the extremity 30*b* of each arm 30*a* is arranged to pass into and through appropriately positioned slots 29*a* at each socket portion 29 for engagement in complementary recesses or slotted portions 28*a* of the respective projections 28 upon partial rotation of such locking member 30 to thus secure the seating unit 1 relative to the respective projections 28. The partial rotation of the locking member 30 can be effected by an external lever 32 and appropriate linkage 33 connected to the locking member 30 and part of said linkage 33 can be arranged for detachable engagement with an appropriate safety lock or like further locking device 34. In the example shown the further locking device 34 is in the form of an arm mounted for movement about a horizontal pivot connection 35 and is spring biassed such as by a compression spring 36 engaged with one end of such locking arm 34, and the other end of such locking arm 34 is provided with a hooked portion 34*a* capable of engaging a link 33*a* movable by the external knob or lever 32 and the like.

Referring now to FIGS. 8 to 13 of the drawings, in which various alternative constructions or modifications of the invention are illustrated by way of example, the wheeled base parts 12 can be separable instead of hingedly connected as a unit to provide advantages in simplification of construction and a reduction in seat height, the latter advantage being particularly useful in applying the invention to smaller motor cars and maintaining desired head room. Accordingly the seating unit 1 can be provided with a rectangular base frame 37 formed at least in part of tubular metal with open rear and front end parts 37*a* and 37*b* respectively, forming sockets in which horizontal arm parts 38*a* and 39*a* of two single rear wheel assembly mountings 38 and two single front castor wheel assembly mountings 39 can be slidably and detachably located.

To prevent movement of the wheel mountings 38 and 39 relative to the base frame 37 when engaged therewith the base frame 37 is formed from rectangular or oval cross-section tube (with the longer axis vertically disposed) and the respective arm parts 38*a* and 39*a* are of complementary cross-section (either solid or hollow), and for stability and to spread the loading on the base frame 37 the rear wheel arm parts 38*a* can be arranged for location in opposite end parts of a rear transverse member of the frame 37 and the front wheel arm parts 39*a* can be each arranged for location in a side member of the frame 37, or vice versa. The respective arm parts 38*a* and 39*a* can be locked in engagement with the base frame 37 by any suitable means, for example by spring biassed pin or peg arrangements 40 slidably mounted on the frame 37 and each having an inner end part locatable in an alignable aperture or recess in the respective arm part 38*a* or 39*a*.

The front wheel mountings 39 can be provided with pivoted footrest members 26, as for the first described construction, and will therefor be collapsible to occupy a minimum of space for stowage. If so desired the transversely directed arm part 38*a* of the rear wheel mounting 38 can be hingeably mounted to also lie parallel with the rear wheel 22 when disengaged from the base frame 37 and to facilitate stowage. The base frame 37 can also be provided with a telescopic or detachable leg rest 41 at one or each side thereof for horizontally supporting a user's leg, the or each leg rest 41 including a shaft part 41*a* slidably located or locatable longitudinally of the base frame 37 in an appropriate and complementary cross-section e.g. rectangular cross-section, socket mounted or provided in the base frame 37.

The base frame 37 of this alternative seating unit is arranged, with the rear and front wheel assemblies removed, to simply locate within a complementary rectangular mounting 42 fixedly mounted in the vehicle front passenger position and having upstanding peripheral flange portions, and is securable in such position by any suitable releasable locking mechanism—in the illustrated example the mounting 42 is provided with a lever arm 43 pivotally mounted on one flange portion and having a projection 44 slidably located through an aperture in the flange portion to have its inner end part locatable in an alignable aperture or recess in the seat unit base frame 37, a similarly pivoted short lever arm 45 and projection 46 can be located at the opposite side of the mounting 42 and pivotally linked by a link rod 47 for simultaneous movement with lever arm 43 and similar engagement of the projection 46 in an aperture or recess on that side of the base frame 37.

The support unit 6 (not shown in FIGS. 8 to 13) for the second form of the invention may be the same as or substantially similar to the first described and illustrated form except that a modification to the pivoted frame 9 can include a braking or locking means to secure the pivoted frame 9 in an outwardly extended position to facilitate engagement of the frame 9 with and disengagement from the seating unit 1, and facilitate the removal and engagement of the wheel base parts 12 with the seating unit 1. In the construction of pivoted frame 9 illustrated in FIGS. 11 and 12 the frame 9 is pivotal at the support shaft 13 and the elbow joint 9*d* between the two parts 9*a* of the frame 9, and the outer end part of the frame 9 has its upper and lower seating unit connections 9*b* and 9*c* connected by a common shaft to permit swivelling relative to the remainder of the frame 9, the swivelling axis, elbow joint axis and shaft axis being parallel; and locking of all swivel or hinge connections of the frame 9 in its extended position can be effected simultaneously by operation of a single lever 48 pivotally connected to the upper end of a rod (not seen) extending co-axially through the elbow joint 9*d*, the pivoted end part 48*a* of the lever 48 being of or including a cam-like formation arranged to bear on the upper side of an inverted cone bearing piece 49 through which the elbow joint rod slidably extends, the arrangement providing that with the lever 48 in one position the elbow joint 9*d* is free to move and with the lever 48 moved over to a second position the cam-like end portion 48*a* exerts pressure on the cone bearing piece 49 to frictionally engage such piece 49 in its complementary bearing seat part 9e. A similar cone bearing piece can be fixedly provided on a lower end part of the elbow joint rod so as to act in opposition at the base of the elbow joint 9d in positive securing of the elbow joint 9d against movement. An extension part 50 of the elbow joint rod (or the lower cone bearing piece) at the base of the joint 9d is of cone or wedge formation and is located in bearing engagement between the ends of two brake thrust rods 51 one of which is mounted for longitudinal sliding movement in mountings 51a below the outer part of the frame 9 and the other of which is similarly mounted below the inner part of the frame so that upward movement of the elbow rod by the lever 48 to effect locking of the elbow joint 9d will simultaneously effect movement of one thrust rod 51 towards the free end of the frame 9 and the other thrust rod 51 towards the inner end of the frame 9 and shaft 13; the ends of the thrust rods 51 are provided with brake shoes or pads 52 e.g. part circular shoes or pads, one of which is arranged to engage with and prevent relative movement of a brake disc or collar part 53 secured to the common shaft of the seating unit connections 9b and 9c, and the other brake shoe or pad 52 being arranged to simultaneously engage with support shaft sleeve 7 or a brake disc or collar part provided therein (or on the support shaft 13 in the alternative construction of FIG. 5). Both brake thrust rods 51 are spring biassed to return to their non-braking positions on release of the lever 48.

Whilst not shown the second form of wheelchair seating unit 1 illustrated in FIGS. 7 to 12 may be provided with detachable armrest parts 4 and pivoted hand grips 27 as for the first described and illustrated construction, and the seating unit lower lug or projection 11 can be hingeable upwardly when not in use in engagement with the frame lower connection 9c instead of the previously illustrated sliding arrangement to provide a clear opening in the base frame 37 so that, with the seat cushion 2a removed and use of an appropriately formed toilet seat part 2c (which can be permanently left within the base frame 37) the wheelchair can, by being appropriately dimensioned and being clear of transverse lower frame members, be backed over most conventional toilet bowls to enable an invalided user to perform his or her toilet operations without assistance and without the need for leaving the wheelchair.

Particular forms of the invention have been described and illustrated by way of example, but it will be appreciated that other variations of and modifications to these embodiments of the invention can take place without departing from the scope of the appended claims. For example the invention has been described with reference to the transporation of a disabled person or invalid by a motor car and the provision in such motor car of the support unit and pivoting frame, but it will be appreciated that the invention may have other applications such as in a hospital or the like for lifting an invalid in a chair for some treatment or other. In the motor car application described, it is further engisaged that audible and/or visual warning means can be provided to indicate that the seating unit 1 is not securely anchored to the support base 5 before the vehicle can be moved e.g. electrical switch means can be provided in or on the support base 5 and coupled to a warning system and or coupled to the ignition system to prevent operation of such ignition system. Also it is envisaged that hydraulically or pneumatically operated ram mechanism and/or mechanical linkage mechanism can be utilised instead of the screw and sleeve arrangement for raising and lowering the seating unit 1.

Thus it will be seen, that by this invention, there is provided a seating unit particularly intended for use by a disabled or invalided person on wheeled base parts to form a wheelchair or as a passenger seat in a motor vehicle, so that it is not necessary to physically move the person from one seat to another when transporting from one place to another e.g. from a conventional unitary wheelchair to a motor car seat, or vice versa. The invention further provides an efficient and effective means for moving the seating unit in and out of the motor vehicle and engagement with or disengagement from the wheeled base parts, and additionally provides wheeled base parts which may be easily collapsed and stowed as required.

We claim:

1. Transportation means for disabled or invalided persons comprising a collapsible wheelchair having a seating unit with a seat part and associated backrest, wheeled base parts with which the seating unit can be detachably engaged for propulsion as required, said wheeled base parts being collapsible in unitary or separable form for stowage, locking means to secure the seating unit to the wheeled base parts when engaged therewith, and said seating unit being arranged for connection to and support by a support unit fixedly mounted remote and separate from the wheeled base; said support unit mounting a movable frame comprising at least two jointed sections pivotal about a vertical axis and having an outer end part arranged for detachable engagement with the seating unit and being arranged to support and carry the seating unit with a person thereon from a first prescribed position to a second prescribed position following disengagement of the seating unit from the wheeled base parts, and being movable from the second prescribed position to the first prescribed position for reengagement of the seating unit with the wheeled base parts and detachment of the movable frame.

2. Transportation means as claimed in claim 1 wherein said support unit includes an axially rotatable upright screw threaded support shaft with which a mounting of the movable frame is engaged so that rotational movement of the support shaft can effect raising or lowering of said movable frame.

3. Transportation means as claimed in claim 2 wherein the movable frame mounting includes a sleeve part having upper and lower housings containing ball bearings engaging the screw thread of the support shaft.

4. Transportation means as claimed in claim 2 wherein the screw threaded support shaft is located within a rigidly mounted outer support tube about which the movable frame mounting is slidably and rotatably located, said frame mounting including a sleeve part having upper and lower housings containing bearings members arranged to project through a longitudinal slot or longitudinal slots in the support tube for engagement with the screw thread of the support shaft.

5. Transportation means as claimed in claim 2 wherein the support shaft is axially rotatable by an electric motor and speed reduction means located at one end of said shaft.

6. Transportation means as claimed in claim 1 wherein the support unit is mounted within a motor car and the seating unit is arranged for use as a wheelchair seating unit externally of the motor car or as a passenger seating unit within the motor car.

7. Transportation means as claimed in claim 1 wherein locking means are provided to secure the jointed sections of the movable frame against movement and when in an outwardly extended position.

8. Transportation means as claimed in claim 7 wherein the movable frame has two sections with a common elbow joint, one inner section being mounted in swivelling relationship to the support shaft and one outer section having its free end part provided with a vertical axially rotatable shaft having upper and lower connections for connection to the seating unit; and the locking means comprises a lever pivotally connected to the upper end of a rod extending co-axially through the elbow joint and having its pivoted end provided with a cam-like formation arranged to bear on the upper side of an inverted cone bearing piece through which the elbow joint rod slidably extends, the lower end of said rod being provided with a fixed bearing piece and the arrangement providing that operation of the lever can cause the cam-like formation to exert pressure on the upper cone bearing piece and movement of the upper and lower bearing piece towards each other and in frictional engagement with upper and lower bearing seat parts of the elbow joint; the lower end part of the elbow joint rod being further provided with a cone or wedged shaped extension located between the ends of two opposed sliding brake thrust rods to simultaneously effect movement of said thrust rods away from the elbow joint on upward movement of the elbow joint rod, both of said thrust rods having their end portions remote from the elbow joint provided with braking devices one of which can lock the inner frame section against movement relative to the support shaft and the other of which can prevent rotational movement of the shaft for the seating unit connections at the outer section free end part.

9. Transportation means as claimed in claim 1 wherein the seating unit has an upper apertured or recessed portion on its backrest arranged for detachable engagement with an upper projection at the outer end of the support movable frame, and a lower engaging part arranged for detachable engagement with a lower part of the movable frame outer end.

10. Transportation means as claimed in claim 9 wherein the seating unit lower engaging part comprises a lug with an open groove or channelled part within which a projection of the support frame outer lower end part is locatable, and said lug is slidably located in a socket at the base of the seating unit to be slidable to a non-projecting position when not in use.

11. Transportation means as claimed in claim 9 wherein the seating unit lower engaging part comprises a lug with an open groove or channelled part within which a projection of the support frame outer lower end part is locatable, and said lug is hingeably mounted to be movable to a non-projecting position when not in use.

12. Transportation means as claimed in claim 1 wherein the wheeled base parts are provided as a unit with hingeably connected parts so as to be collapsible from an erected position for stowage and transportation when not being utilised as part of the wheelchair.

13. Transportation means as claimed in claim 12 wherein said base parts include side frame members conjoined by upper front and rear transverse frame members which each have a medial pivot connection and end portions pivotally engaged with the side members, the pivot axes of one transverse member being vertically disposed and the pivot axes of the other transverse member being horizontally and longitudinally disposed relative to the side members, and there being bolt means to secure each transverse frame member against movement of their respective medial pivot connections to lock the unit of wheeled base parts in an erected non-collapsible position.

14. Transportation means as claimed in claim 12 wherein the seating unit is arranged for use in combination with the unit of wheeled base parts as a wheelchair or use in combination with a base support secured within a motor car as a passenger seating unit, a frame of said wheeled base parts and said vehicle base support having a plurality of upstanding projections and the seating unit having a plurality of complementary socket parts arranged for location over and engagement with either the projection of the wheeled base parts or the projections of the vehicle base support, there being locking means for securement of the seating unit to either the wheeled base parts or the vehicle base support.

15. Transportation means as claimed in claim 14 wherein said locking means comprises a locking member located within a base part of the seating unit and movable in a horizontal plane by lever mechanism, said locking member having projecting peripheral parts arranged to be locatable in and through apertures provided in the seating unit socket parts for engagement in alignable apertures or recesses provided in the respective projections of the wheeled base parts frame and vehicle base support.

16. Transportation means as claimed in claim 1 wherein the wheeled base parts comprise two single rear wheel assemblies and two single front castor wheel assemblies, each assembly having a horizontal arm part which is slidably and detachably locatable in a respective appropriately positioned socket part of a base frame of the seating unit, there being locking means to lock the arm parts in their respective socket parts.

17. Transportation means as claimed in claim 16 wherein the seating unit base frame is of tubular metal construction with corner parts opening to form the socket parts for the wheeled assembly arm parts.

18. Transportation means as claimed in claim 16 wherein said seating unit base frame is, with the wheel assemblies removed, arranged for location within and securement to a complementary mounting in a motor car for use of the seating unit as a car passenger seating unit.

19. Transportation means as claimed in claim 1 wherein the seating unit has a removable seat cushion over a base frame and fitted toliet seat member, and the wheel base parts are dimensioned at the rear and are constructed without any lower rear transverse members so that the seating unit is manoeuvrable rearwardly on said wheeled base parts to locate over a conventional toliet bowl.

* * * * *